United States Patent
Gu et al.

(10) Patent No.: US 11,693,913 B2
(45) Date of Patent: Jul. 4, 2023

(54) SEARCHING SAAS VIRTUAL APPLICATIONS

(71) Applicant: Citrix Systems, Inc., Fort Lauderdale, FL (US)

(72) Inventors: Youjun Gu, Nanjing (CN); Fuping Zhou, Nanjing (CN); Wenping Xu, Nanjing (CN); Xiao Yuan, Nanjing (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 538 days.

(21) Appl. No.: 16/532,959

(22) Filed: Aug. 6, 2019

(65) Prior Publication Data
US 2021/0004425 A1    Jan. 7, 2021

Related U.S. Application Data

(63) Continuation of application No. PCT/CN2019/094717, filed on Jul. 4, 2019.

(51) Int. Cl.
| G06F 16/00 | (2019.01) |
| G06F 16/9538 | (2019.01) |
| H04L 67/00 | (2022.01) |
| H04L 9/40 | (2022.01) |
| G06F 16/9532 | (2019.01) |

(52) U.S. Cl.
CPC ...... *G06F 16/9538* (2019.01); *G06F 16/9532* (2019.01); *H04L 63/0815* (2013.01); *H04L 67/34* (2013.01)

(58) Field of Classification Search
None
See application file for complete search history.

(56) References Cited

U.S. PATENT DOCUMENTS 10,623,929 B1 *   4/2020   Harpale ............... H04W 12/06
2010/0218092 A1   8/2010   Xiang et al.
(Continued)

FOREIGN PATENT DOCUMENTS

CN          103793279 A      5/2014

OTHER PUBLICATIONS

Le, Steven et al. Dynamic mobility applications open source application development portal : Task 3.3 : concept of operations : final report. Oct. 12, 2016. 2016.*

(Continued)

*Primary Examiner* — Tuankhanh D Phan
(74) *Attorney, Agent, or Firm* — Hoffman Warnick LLC

(57) ABSTRACT

Methods and systems for searching SaaS virtual applications are disclosed. One method includes receiving a set of search terms for a search of a virtual application, the search of the virtual application being executable without having the virtual application open on a computing device. The search request is provided to a source of the virtual application, the request including the set of search terms for the virtual application. At least one response is received from the source of the virtual application based on the set of search terms. A list of search results is provided to the computing device to enable selection of the virtual application from a plurality of other virtual applications accessible via the computing device, the list of search results including the received at least one response.

20 Claims, 12 Drawing Sheets

(56) References Cited

U.S. PATENT DOCUMENTS

| | | |
|---|---|---|
| 2015/0186533 A1 | 7/2015 | Patil et al. |
| 2015/0286680 A1 | 10/2015 | Shapira et al. |
| 2015/0319174 A1 | 11/2015 | Hayton et al. |
| 2016/0269926 A1* | 9/2016 | Sundaram ............ H04L 41/5054 |
| 2016/0366036 A1* | 12/2016 | Gupta ..................... H04L 67/16 |
| 2017/0118186 A1* | 4/2017 | Kaipu ..................... G06F 16/14 |
| 2018/0083944 A1 | 3/2018 | Vats et al. |

OTHER PUBLICATIONS

International Search Report and Written Opinion dated Apr. 2, 2020 for Application No. PCT/CN2019/094717 filed Jul. 4, 2019; p. 9.
European Search Report dated Dec. 2, 2022 for EP Application 19936018.1; pp. 7.

\* cited by examiner

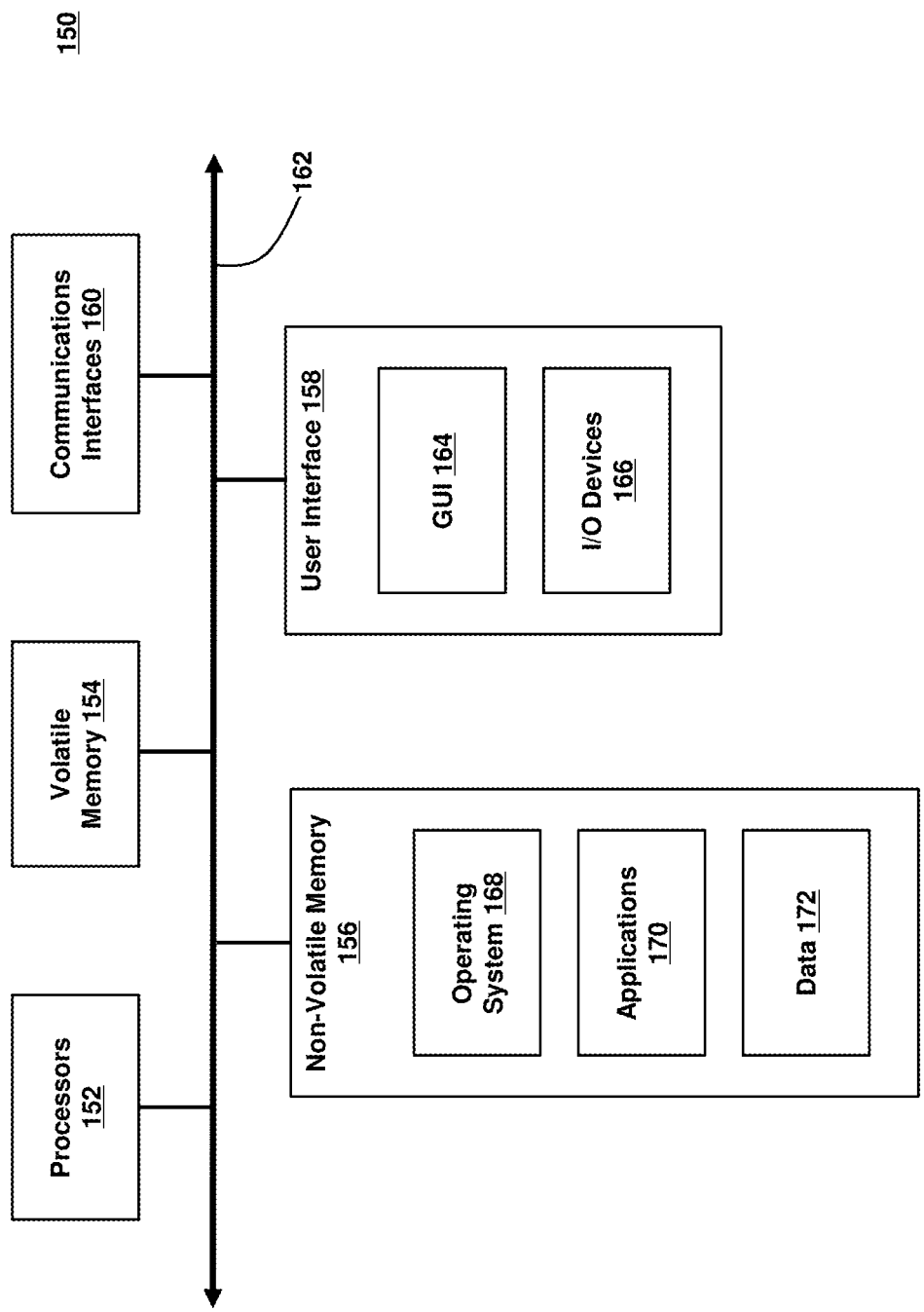

| Name 430 | Search Location 432 | Request Format 434 | Response Format 436 | Communication Protocol 438 | Authentication? 440 | Authentication Method 442 |
|---|---|---|---|---|---|---|
| SaaS-1 | URL SaaS-1 | Request SaaS-1 | Response SaaS-1 | Comm SaaS-1 | NO | NA |
| SaaS-2 | URL SaaS-2 | Request SaaS-2 | Response SaaS-2 | Comm SaaS-2 | YES | Auth-1 |
| ••• | ••• | ••• | ••• | ••• | ••• | ••• |
| SaaS-n | URL SaaS-n | Request SaaS-n | Response SaaS-n | Comm SaaS-n | NO | NA |

SEARCHING SAAS VIRTUAL APPLICATIONS

BACKGROUND

Personal computers include combinations of operating systems, applications, and user settings, which are each managed individually by owners or administrators on an ongoing basis. However, many organizations are now using application virtualization and/or desktop virtualization to provide a more flexible option to address the varying needs of their users. In desktop virtualization, for example, the computing environment of a user may be separated from the physical client computing device of the user. In application virtualization, an application may be administered by and executed on a remote server, and may be accessed by a user by opening a corresponding virtual application on the client computing device.

Web applications are another approach to remotely provisioning and providing applications. One example of a web application approach for software licensing and delivery is Software as a Service (SaaS). SaaS is an approach to software delivery by which software applications are hosted remotely and provided on a subscription basis to users. A SaaS application may be accessed by opening a corresponding SaaS virtual application on a client computing device.

SUMMARY

A first aspect of the disclosure is directed to a method for searching applications. The method includes receiving a set of search terms for a search of a virtual application, the search of the virtual application being executable without having the virtual application open on a computing device. The search request is provided to a source of the virtual application, the request including the set of search terms for the virtual application. At least one response is received from the source of the virtual application based on the set of search terms. A list of search results is provided to the computing device to enable selection of the virtual application from a plurality of other virtual applications accessible via the computing device, the list of search results including the received at least one response.

A second aspect of the disclosure is directed to a computing device including a memory and a processor coupled to the memory that is configured to perform a method for searching applications. The method includes receiving a set of search terms for a search of a virtual application, the search of the virtual application being executable without having the virtual application open on a computing device. The search request is provided to a source of the virtual application, the request including the set of search terms for the virtual application. At least one response is received from the source of the virtual application based on the set of search terms. A list of search results is provided to the computing device to enable selection of the virtual application from a plurality of other virtual applications accessible via the computing device, the list of search results including the received at least one response.

A third aspect of the disclosure is directed to a computer program product stored on a computer readable storage medium, which when executed by a computing system, performs a method for searching applications. The method includes receiving a set of search terms for a search of a virtual application, the search of the virtual application being executable without having the virtual application open on a computing device. The search request is provided to a source of the virtual application, the request including the set of search terms for the virtual application. At least one response is received from the source of the virtual application based on the set of search terms. A list of search results is provided to the computing device to enable selection of the virtual application from a plurality of other virtual applications accessible via the computing device, the list of search results including the received at least one response.

In certain aspects, the virtual application may be a Software as a Service (SaaS) virtual application.

In certain aspects, the search request may include configuration information for the virtual application, the configuration information including: a name of the virtual application; a location of the source of the virtual application; a format for the search request and the at least one response; and a communication protocol for the search request and the at least one response.

In certain aspects, the configuration information for the virtual application may include: an authentication attribute for the search request; and an authentication method, if authentication is required for the search request.

In certain aspects, the search results list is provided to a user and, in response to a user selection of an item in the search results list, the virtual application corresponding to the selected item is opened.

In certain aspects, the user is brought directly to a source page of content in the virtual application in response to the selection of the item.

In certain aspects, the search request is provided to a common virtual application, and the search request is forwarded from the common virtual application to the source of the virtual application.

In certain aspects, the at least one response is received at a common application, and the common application forwards the at least one response to the computer device.

In certain aspects, a single sign-on (SSO) token for a user is sent to a common virtual application, and the user is authenticated with the common virtual application using the SSO token of the user.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure.

FIG. 1C is a block diagram of a computing device according to embodiments.

FIG. 5 depicts illustrative configuration information for a searchable SaaS virtual application according to embodiments.

The drawings are intended to depict only typical aspects of the disclosure, and therefore should not be considered as limiting the scope of the disclosure. In the drawings, like numbering represents like elements between the drawings.

DETAILED DESCRIPTION

Client applications provide access to desktops, data, devices, and applications, including local and virtual applications (e.g., Software as a System (SaaS) applications, web applications, mobile applications, etc.). Data searches in virtual applications accessed via such a client application are often limited to shared files and the names of the virtual applications.

SaaS applications often include their own search functionalities. To search for specific data within a SaaS virtual application, a user is required to first launch the SaaS virtual application and then perform a search using the search functionality of the SaaS virtual application. In cases where a user needs to search for data in a plurality of different SaaS virtual applications, the user is required to launch and perform a separate search in each of the plurality of SaaS virtual applications. Searching across different SAAS applications can lead to user frustration and diminished adoption of such applications by users. For example, using existing technologies users need to stop using one application and launch another application to access data stored therein which is time consuming and inefficient. Moreover, launching applications while a user performs a task is distracting and promotes further inefficiencies, such as lost time or rework. This may be especially true in the enterprise environments where users may have a need to access data from several such applications.

Aspects of the disclosure are directed to systems and methods for performing data searches in SaaS virtual applications. The data searches may be performed using search functionalities of the SaaS virtual applications, without having to launch and perform a search in each individual SaaS virtual application. Thus, the techniques and methods described herein eliminate or otherwise significantly reduce user distraction and/or inefficiencies with use of client and/or SAAS applications because users no longer have to launch virtual applications on an individual basis in order to search and/or access data contained therein.

For purposes of reading the description of the various embodiments below, the following descriptions of the sections of the specification may be helpful:

Section A describes a network and computing environment which may be useful for practicing embodiments described herein;

Section B describes embodiments of systems and methods for delivering a computing environment to a remote user;

Section C describes embodiments of systems and methods for virtualizing an application delivery controller; and Section D describes systems and methods for searching SaaS virtual applications according to various embodiments.

A. Network and Computing Environment

Figure 1A:
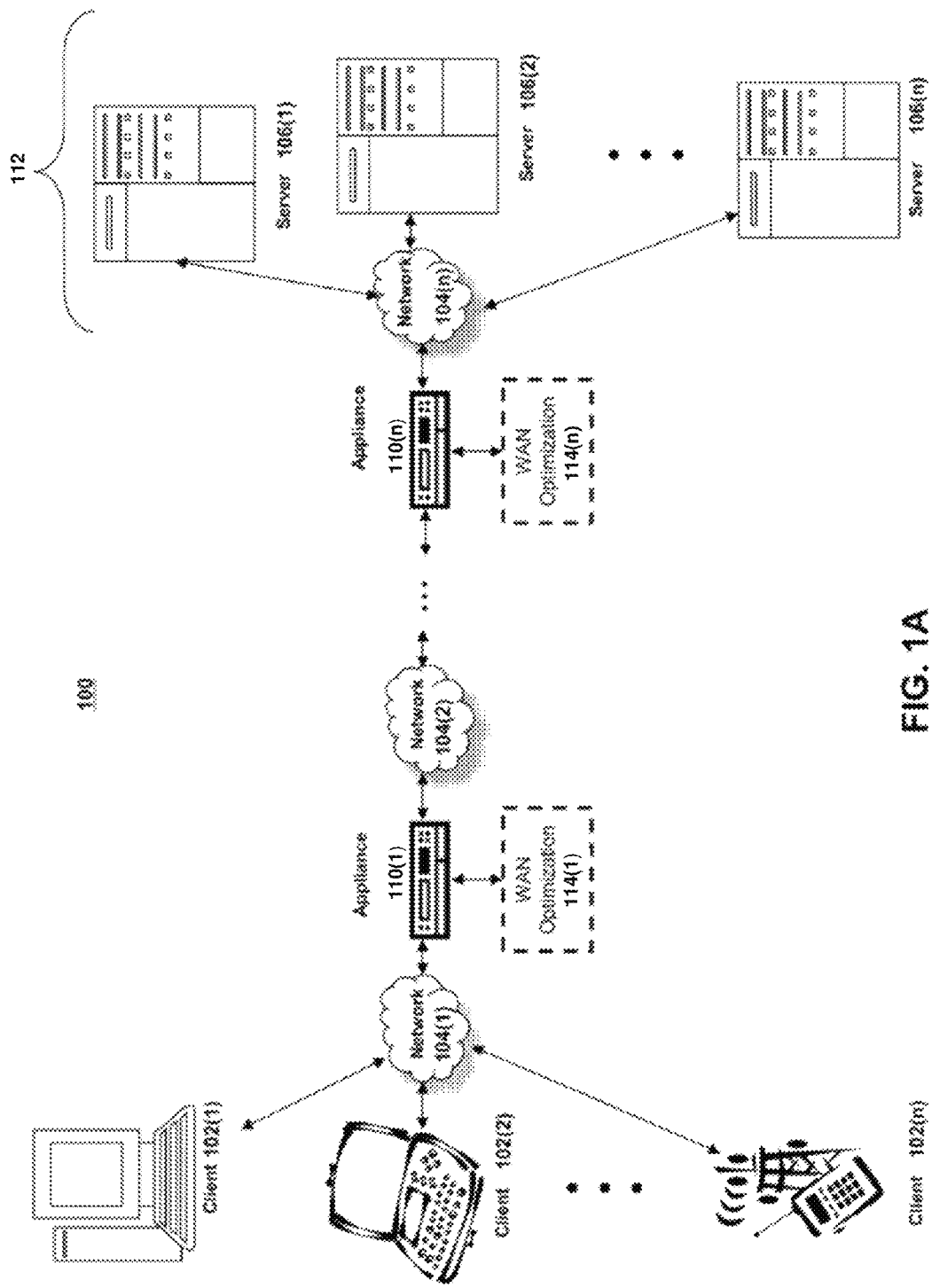
FIG. 1A is a block diagram of a network environment according to embodiments.

Referring to FIG. 1A, an illustrative network environment 100 is depicted. The network environment 100 may include one or more clients 102(1)-102(n) (also generally referred to as local machine(s) 102, or client(s) 102) in communication with one or more servers 106(1)-106(n) (also generally referred to as server(s) 106, or remote machine(s) 106) via one or more networks 104(1)-104(n) (generally referred to as network(s) 104). In some embodiments, a client 102 may communicate with a server 106 via one or more appliances 110(1)-110(n) (generally referred to as appliance(s) 110 or gateway(s) 110).

Although the embodiment depicted in FIG. 1A shows one or more networks 104 between the clients 102 and the servers 106, the clients 102 and the servers 106 may be on the same network 104. The various networks 104 may be the same type of network or different types of networks. For example, in some embodiments, one or more of the networks 104 may be a private network such as a local area network (LAN) or a company Intranet, while one or more of the other networks 104 may be a public network, such as a wide area network (WAN) or the Internet. In other embodiments, one or more of the networks 104 may be public networks, while one or more of the other networks 104 may be private networks. The networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

One or more appliances 110 may be located at various points or in various communication paths of the network environment 100. For example, an appliance 110(1) may be deployed between two networks 104(1) and 104(2). The appliances 110 may communicate with one another to work in conjunction to, for example, accelerate network traffic between the clients 102 and the servers 106. In other embodiments, an appliance 110 may be located on a network 104. For example, an appliance 110 may be implemented as part of one of clients 102 and/or servers 106. In an embodiment, an appliance 110 may be implemented as a network device such as Citrix Networking products including, for example, Citric ADC and Citrix Gateway, sold by Citrix Systems, Inc. of Fort Lauderdale, Fla.

One or more servers 106 may operate as a server farm 112. The servers 106 of the server farm 112 may be logically grouped, and may either be geographically co-located (e.g., on premises) or geographically dispersed (e.g., cloud based) from the clients 102 and/or other servers 106. In an embodiment, the server farm 112 may execute one or more services such as applications on behalf of one or more of the clients 102 (e.g., as an application server), although other uses are possible, such as a file server, gateway server, proxy server, or other similar server uses. A client 102 may seek access to hosted application(s) on one or more servers 106.

In some embodiments, the appliances 110 may include, be replaced by, or be in communication with, one or more additional appliances, such as WAN optimization appliances 114(1)-114(n), referred to generally as WAN optimization appliance(s) 114. For example, an WAN optimization appliance 114 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, an appliance 114 may be a performance enhancing proxy or a WAN optimization controller.

Figure 1B:
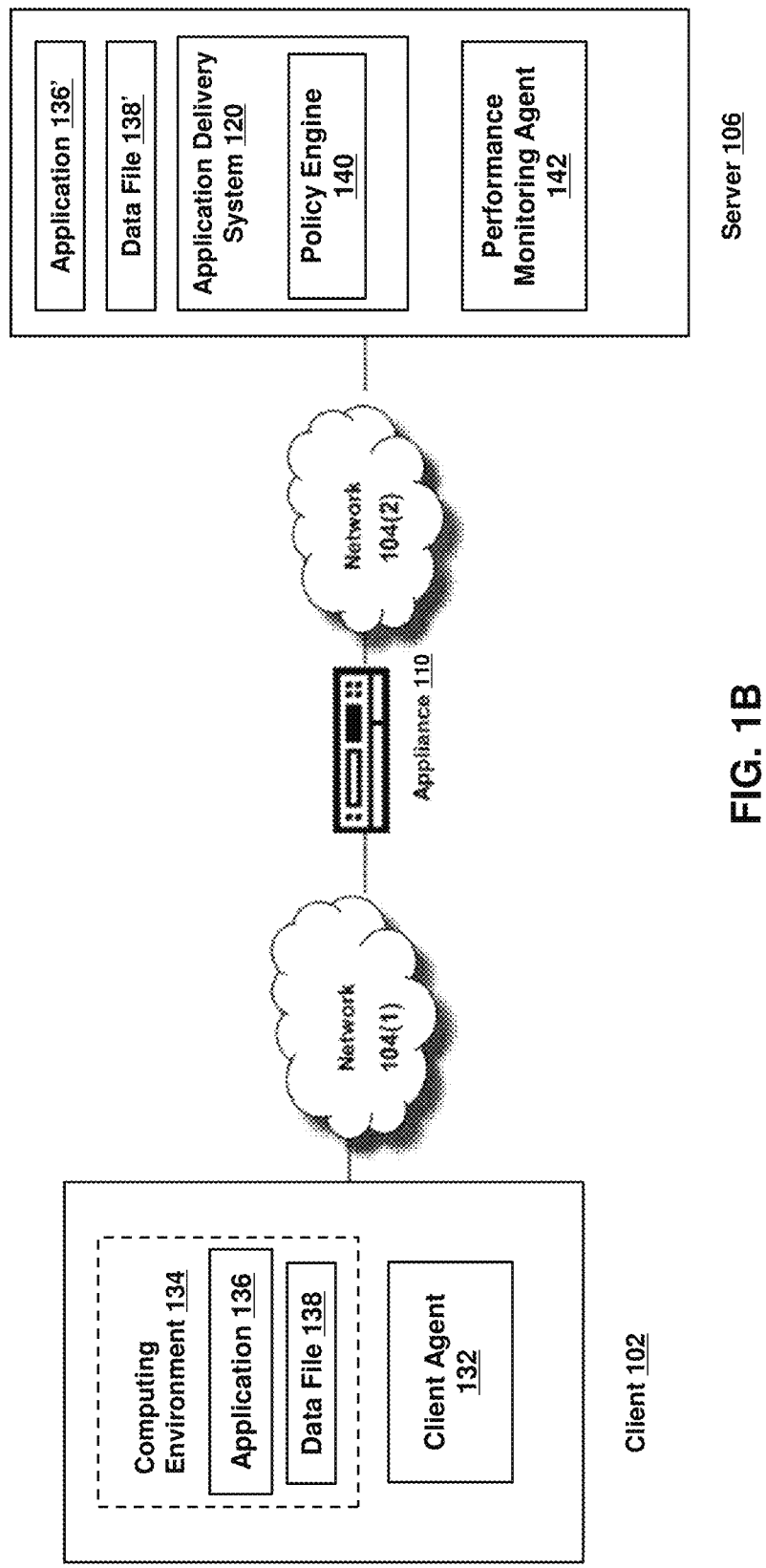
FIG. 1B is a block diagram of a network environment for delivering a computing environment from a server to a client via an appliance according to embodiments.

Referring to FIG. 1B, an example network environment for delivering and/or operating a computing network environment on a client 102 is shown. As shown in FIG. 1B, a server 106 may include an application delivery system 120 for delivering a computing environment, application, and/or data files to one or more clients 102. The server 106 may access additional servers, e.g., servers that provide specific functions that support delivering the computing network environment, for example, a computing environment, application, and/or data files to one or more clients 102. A client 102 may include a client agent 132 and a computing environment 134. The computing environment 134 may execute or operate an application 136 that accesses, processes or uses a data file 138. The computing environment 134, application 136, and/or data file 138 may be delivered to the client 102 via an appliance 110 and/or a server 106.

An appliance 110 may accelerate delivery of all or a portion of computing environment 134 to a client 102, for example by the application delivery system 120. An appliance 110 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection, and/or provide encryption and decryption operations.

The application delivery system 120 may deliver a computing environment 134 to a user (e.g., client 102), remote or otherwise, based on authentication and authorization policies applied by a policy engine 140. A remote user may obtain a computing environment and access to server stored applications and data files from any network-connected device (e.g., client 102). For example, an appliance 110 may request an application 136' and data file 138' from server 106. In response to the request, the application delivery system 120 and/or server 106 may deliver the application 136' and data file 138' to the client 102, for example via an application stream to operate in a computing environment 134 on the client 102, or via a remote-display protocol or otherwise via remote-based or server-based computing. In an embodiment, the application delivery system 120 may be implemented as any portion of the Citrix Workspace Suite™ by Citrix Systems, Inc., such as Citrix Virtual Apps and Desktops.

The policy engine 140 may control and manage access to, and execution and delivery of, applications. For example, the policy engine 140 may determine which applications a user or client 102 may access and/or how the application should be delivered to the user or client 102, such as via server-based computing, streaming, or delivering of the application locally to client 102 for local execution. For example, in operation, a client 102 may request execution of an application (e.g., application 136') and the application delivery system 120 of a server 106 determines how to execute the application 136', for example based upon credentials received from the client 102 and a user policy applied by the policy engine 140 associated with the credentials. For example, the application delivery system 120 may enable a client 102 to receive application-output data generated by execution of the application on a server 106, may enable a client 102 to execute the application locally after receiving the application from a server 106, may stream the application via a network 104 to a client 102, or may access another server to execute at least part of the application functions. For example, in some embodiments, the application may be a server-based or a remote-based application executed on a server 106 on behalf of a client 102. A server 106 may display output to a client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS), or platform as a service (PaaS).

One or more servers 106 may include a performance monitoring service or agent 142. In some embodiments, one or more dedicated servers 106 may be employed to perform performance monitoring. Performance monitoring may be performed using data collection, aggregation, analysis, management, and reporting, for example by software, hardware, or a combination thereof. Performance monitoring may include one or more agents for performing monitoring, measurement, and data collection activities on clients 102 (e.g., client agent 132), servers 106 (e.g., agent 142), or an appliances 110 and/or 114 (agent not shown). In general, performance monitoring agents 142 execute transparently (e.g., in the background) to any application and/or user of the device. In some embodiments, performance monitoring agent 142 includes any of the product embodiments referred to as Citrix Analytics by Citrix Systems, Inc. of Fort Lauderdale, Fla.

In described embodiments, clients 102, servers 106, and appliances 110 and 114 may be deployed as and/or executed on any type and form of computing device, such as any desktop computer, laptop computer, or mobile device capable of communication over at least one network and performing the operations described herein. For example, clients 102, servers 106, and/or appliances 110 and 114 may each correspond to one computing device, a plurality of computing devices, or a network of distributed computing devices, such as the computing device 150 shown in FIG. 1C.

As shown in FIG. 1C, the computing device 150 may include one or more processors 152, volatile memory 154 (e.g., RAM), non-volatile memory 156 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof). The computing device 150 may further include user interface(s) 158, communications interface(s) 160, and communication bus(es) 162. The user interface(s) 158 may include graphical user interface(s) (GUI) 164 (e.g., a touchscreen, a display, etc.) and one or more input/output (I/O) devices 166 (e.g., a mouse, a keyboard, etc.). The non-volatile memory 156 stores an operating system 168, one or more applications 170, and data 172 such that, for example, computer instructions of operating system 168 and/or applications 170 are executed by processor(s) 152 out of volatile memory 154. Data may be entered using an input device of GUI 164 or received from I/O device(s) 166. Various elements of the computing device 150 may communicate via communication bus(es) 162. The computing device 150 in FIG. 1C is shown merely as an example, as clients 102, servers 106, and/or appliances 110 and 114 may be implemented by any computing or processing environment and with any type of machine or set of machines that may have suitable hardware and/or software capable of operating as described herein.

The processor(s) 152 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interface(s) 160 may include one or more interfaces to enable the computing device 150 to access a computer network such as a LAN, a WAN, or the Internet through a variety of wired and/or wireless or cellular connections.

In described embodiments, a computing device 150 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, and/or may provide access to a computing environment including one or more of: one or more applications, one or more desktop applications, and one or more desktop sessions in which one or more applications may execute.

B. Appliance Architecture

Figure 2:
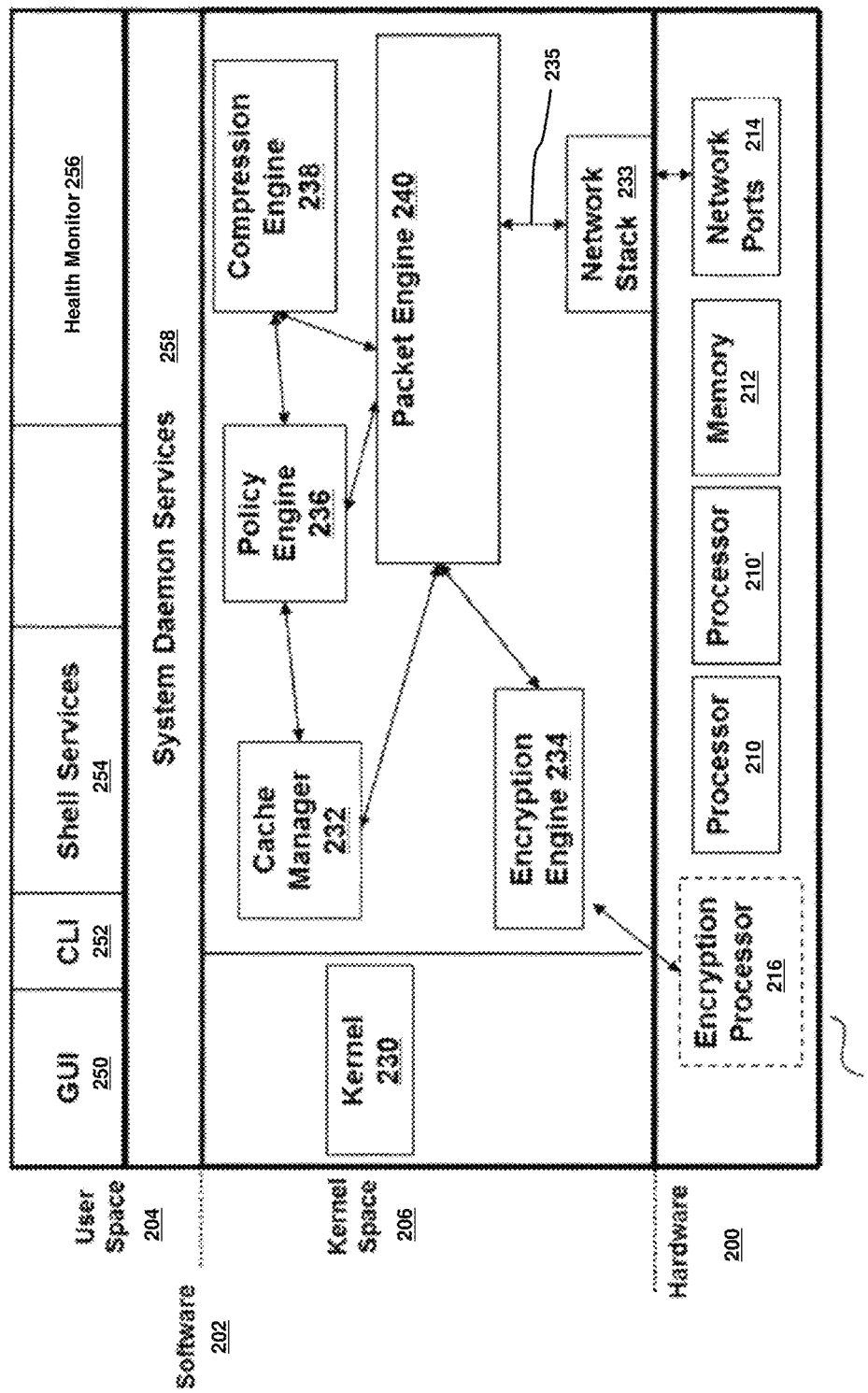
FIG. 2 is a block diagram of an appliance for processing communications between a client and a server according to embodiments.

FIG. 2 shows an example embodiment of an appliance 110. As described herein, an appliance 110 may be implemented as a server, gateway, router, switch, bridge, or other type of computing or network device. As shown in FIG. 2, an embodiment of an appliance 110 may include a hardware layer 200 and a software layer 202, the latter divided into a user space 204 and a kernel space 206. The hardware layer 200 provides the hardware elements upon which programs and services within the user space 204 and the kernel space 206 are executed and allow programs and services within the user space 204 and the kernel space 206 to communicate data both internally and externally with respect to the appliance 110. The hardware layer 200 may include one or more processors 210, 210' for executing software programs and services, memory 212 for storing software and data, network ports 214 for transmitting and receiving data over a network, and an encryption processor 216 for encrypting and decrypting data such as in relation to Secure Socket Layer (SSL) or Transport Layer Security (TLS) processing of data transmitted and received over the network.

An operating system of the appliance 110 allocates, manages, or otherwise segregates the available system memory into the user space 204 and the kernel space 206. The kernel space 206 is reserved for running kernel 230, including any device drivers, kernel extensions, or other kernel related software. The kernel space 206 may also include a number of network services or processes working in conjunction with a cache manager 232. The appliance 110 may include one or more network stacks 233, such as a TCP/IP based stack, for communicating with client(s) 102, server(s) 106, network(s) 104, and/or other appliances 110 or 114. Each network stack 233 may include a buffer 235 for queuing one or more network packets for transmission by the appliance 110.

The kernel space 206 may include a cache manager 232, an encryption engine 234, a policy engine 236, a compression engine 238, and a packet engine 240. One or more of processes (e.g., cache manager 232, encryption engine 234, policy engine 236, compression engine 238, and/or packet engine 240) run in the core address space of the operating system of the appliance 110, which may reduce the number of data transactions to and from the memory and/or context switches between kernel mode and user mode. The cache manager 232 may duplicate original data stored elsewhere or data previously computed, generated or transmitted to reducing the access time of the data. In some embodiments, the cache memory may be a data object in the memory 212 of the appliance 110, or may be a physical memory having a faster access time than the memory 212.

The policy engine 236 may include a statistical engine or other configuration mechanism to allow a user to identify, specify, define, or configure a caching policy and access, control, and manage objects, data, or content being cached by the appliance 110, and define or configure security, network traffic, network access, compression or other functions performed by the appliance 110.

The encryption engine 234 may process any security related protocol, such as SSL or TLS. For example, the encryption engine 234 may encrypt and decrypt network packets, or any portion thereof, communicated via the appliance 110, may setup or establish SSL, TLS or other secure connections, for example between client(s) 102, server(s) 106, and/or other appliance(s) 110 or 114. In some embodiments, the encryption engine 234 may use a tunneling protocol to provide a VPN between a client 102 and a server 106. The encryption engine 234 may be in communication with the encryption processor 216. The compression engine 238 compresses network packets bi-directionally between clients 102 and servers 106 and/or between one or more appliances 110.

The packet engine 240 may manage kernel-level processing of packets received and transmitted by the appliance 110 via the network stacks 234 to send and receive network packets via network ports 214. The packet engine 240 may operate in conjunction with the encryption engine 234, cache manager 232, policy engine 236, and compression engine 238, for example to perform encryption/decryption, traffic management such as request-level content switching and request-level cache redirection, and compression and decompression of data.

The user space 204 is a memory area or portion of the operating system used by user mode applications or programs otherwise running in user mode. A user mode application may not access the kernel space 206 directly and uses service calls in order to access kernel services. The user space 204 may include a graphical user interface (GUI) 250, command line interface (CLI) 252, shell services 254, health monitor 256, and system daemon services 258. The GUI 250 and CLI 252 enable a system administrator or other user to interact with and control the operation of the appliance 110, such as via the operating system of the appliance 110. The shell services 254 include the programs, services, tasks, processes or executable instructions to support interaction with the appliance 110 by a user via the GUI 250 and/or CLI 252.

The health monitor 256 monitors, checks, reports, and ensures that network systems are functioning properly and that users are receiving requested content over a network, for example by monitoring activity of the appliance 110. In some embodiments, the health monitor 256 intercepts and inspects any network traffic passed via the appliance 110. For example, the health monitor 256 may interface with one or more of the encryption engine 234, cache manager 232, policy engine 236, compression engine 238, packet engine 240, system daemon services 258, and shell services 254 to determine a state, status, operating condition, or health of any portion of the appliance 110. Further, the health monitor 256 may determine if a program, process, service or task is active and currently running, check status, error or history logs provided by any program, process, service, or task to determine any condition, status, or error with any portion of the appliance 110. Additionally, the health monitor 256 may measure and monitor the performance of any application, program, process, service, task or thread executing on the appliance 110.

System daemon services 258 are programs that run continuously or in the background and handle periodic service requests received by the appliance 110. In some embodiments, the system daemon service 258 may forward the requests to other programs or processes, such as another daemon service 258, as appropriate.

As described herein, each client 102 may include a client agent 132 for establishing and exchanging communications with an appliance 110 and/or a server 106 via a network 104. The client 102 may have installed and/or execute one or more applications that are in communication with the network 104. The client agent 132 may intercept network communications from a network stack used by the one or more applications.

C. Systems and Methods for Providing Virtualized Application Delivery Controller Referring now to FIG. 3, a block diagram of a virtualized environment 300 is shown. A virtualized computing device 302 in the virtualized environment 300 includes a virtualization layer 304, a hypervisor layer 306, and a hardware layer 308. The hypervisor layer 306 includes at least one hypervisor (or virtualization manager) 320 that allocates and manages access to a number of physical resources in the hardware layer 308 (e.g., physical processor(s) 322 and physical disk(s) 324) by at least one virtual machine (VM) 330 (e.g., one of the VMs 330) executing in the virtualization layer 304. Each VM 330 may include allocated virtual resources such as virtual processors 332 and/or virtual disks 342, as well as virtual resources such as virtual memory and virtual network interfaces. In some embodiments, at least one of the VMs 330 may include a control operating system (e.g., 340) in communication with the hypervisor 320 and used to execute applications for managing and configuring other VMs (e.g., guest operating systems 340a) on the computing device 302.

In general, the hypervisor(s) 320 may provide virtual resources to an operating system of VMs 330 in any manner that simulates the operating system having access to a physical device. Thus, the hypervisor(s) 320 may be used to emulate virtual hardware, partition physical hardware, virtualize physical hardware, and execute virtual machines that provide access to computing environments.

The hypervisor 320 may create one or more VMs 330 in which an operating system (e.g., control operating system 340 and/or guest operating system 340a) executes. For example, the hypervisor 320 loads a virtual machine image to create VMs 330 to execute an operating system. The hypervisor 320 may present VMs 330 with an abstraction of the hardware layer 308, and/or may control how physical capabilities of the hardware layer 308 are presented to the VMs 330. For example, the hypervisor(s) 320 may manage a pool of resources distributed across multiple physical computing devices.

In some embodiments, a VM 330 (e.g., a VM executing the control operating system 340) may manage and configure other VMs 330, for example by managing the execution and/or termination of a VM and/or managing allocation of virtual resources to a VM. In various embodiments, the VMs may communicate with the hypervisor(s) 320 and/or other VMs via, for example, one or more Application Programming Interfaces (APIs), shared memory, and/or other techniques.

In general, the VMs 330 may provide a user of the computing device 302 with access to resources within the virtualized computing environment 300, for example, one or more programs, applications, documents, files, desktop and/or computing environments, or other resources. In some embodiments, the VMs 330 may be implemented as fully virtualized VMs that are not aware that they are virtual machines (e.g., a Hardware Virtual Machine or HVM). In other embodiments, a VM may be aware that it is a virtual machine, and/or a VM may be implemented as a paravirtualized (PV) VM.

Figure 3:
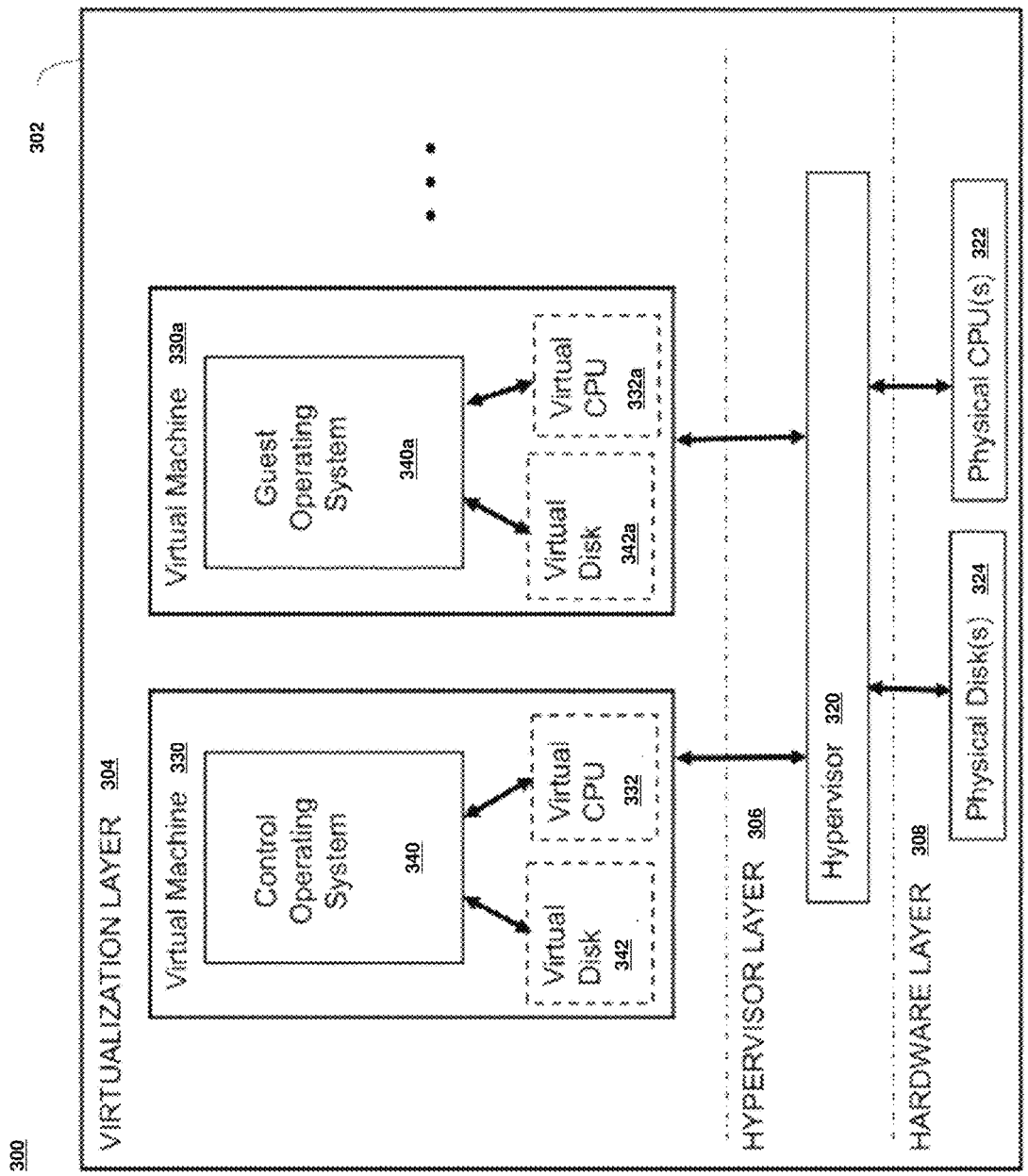
FIG. 3 is a block diagram of a virtualization environment according to embodiments.

Although shown in FIG. 3 as including a single computing device 302, the virtualized environment 300 may include a plurality of networked devices in a system in which at least one physical host executes a virtual machine. An appliance 110 may be additionally or alternatively implemented in a virtualized environment 300 on any computing device, such as a client 102, server 106, or appliance 110. Virtual appliances may provide functionality for availability, performance, health monitoring, caching and compression, connection multiplexing and pooling and/or security processing (e.g., firewall, VPN, encryption/decryption, etc.), similarly as described in regard to the appliance 110.

In some embodiments, a server may execute multiple virtual machines 330, for example on various cores of a multi-core processing system and/or various processors of a multiple processor device. For example, although generally shown herein as "processors", one or more of the processors may be implemented as either single- or multi-core processors to provide a multi-threaded, parallel architecture and/or multi-core architecture. Further, instead of (or in addition to) the functionality of being implemented in the form of a physical processor/core, such functionality may be implemented in a virtualized environment (e.g., 300) on a client 102, server 106, or appliance 110, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

D. Systems and Methods for Searching SaaS Virtual Applications

Figure 4:
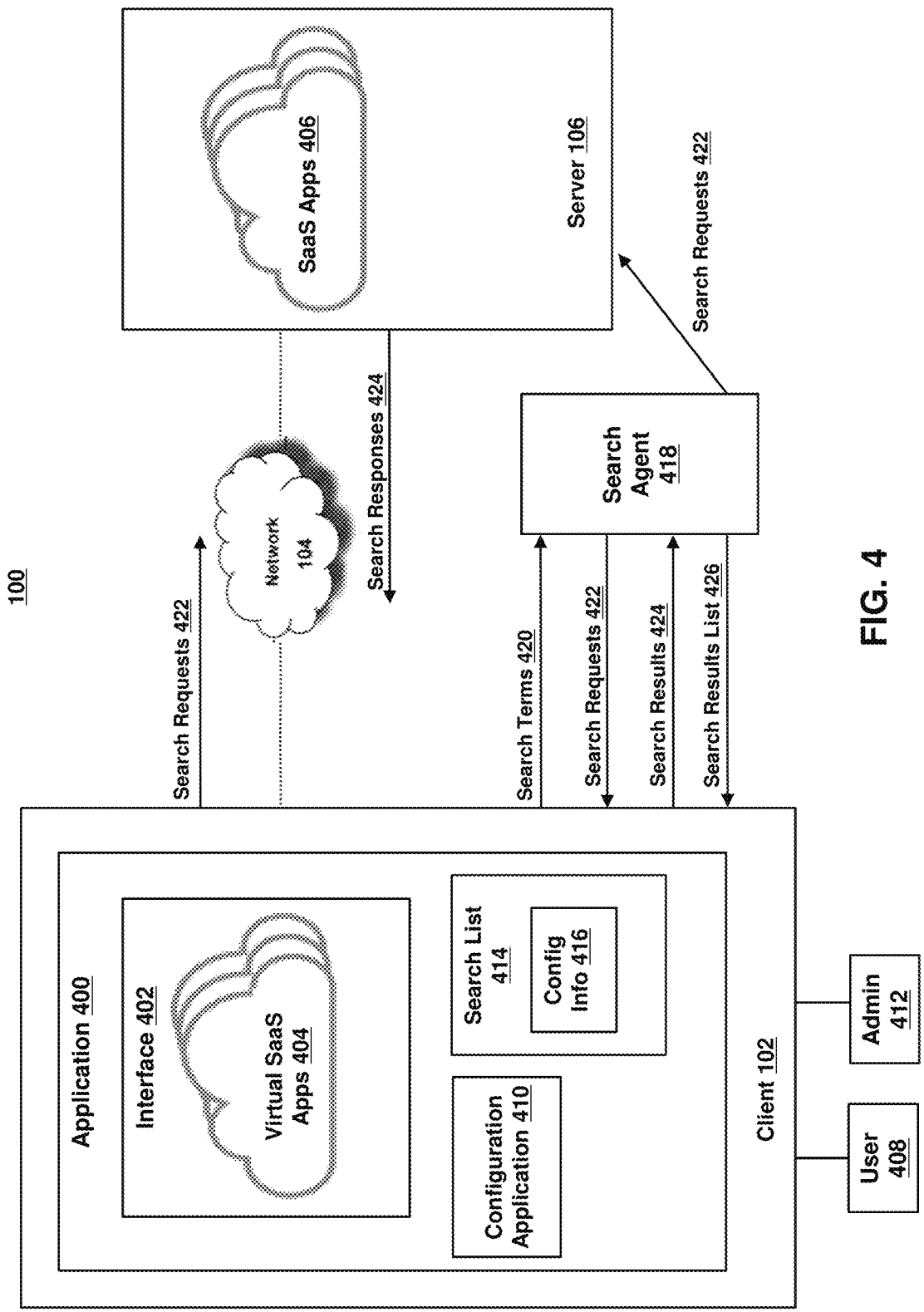
FIG. 4 depicts a system for searching SaaS virtual applications according to embodiments.

FIG. 4 depicts a system for searching SaaS virtual applications according to embodiments. In FIG. 4, a client application 400 (e.g., Citrix Workspace) is running on a client 102 in a network environment 100. The client application 400 provides a unified interface 402 (hereafter interface 402) including a plurality of searchable SaaS virtual applications 404 (also referred to herein as SaaS virtual applications 404). The source SaaS applications 406 corresponding to the searchable SaaS virtual applications 404 are installed on one or more servers 106 (only one shown in FIG. 4). The source SaaS applications 406 may be "published," i.e., the source SaaS applications 406 run on the server(s) 106, consume server resources, and transfer (e.g., via one or more networks 104) screen updates and keyboard and mouse commands from the servers 106 to the client application 400 on the client 102. To a user 408 of the client 102, it appears as if they are using a source SaaS application 406 running on the client 102; the virtualization is transparent to the user 408. A searchable SaaS virtual application 404 may be opened (e.g., launched), for example, via the interface 402 of the client application 400 on the client 102.

The client application 400 may include/access a web or file-based configuration application 410. An administrator 412 (and/or a user 408) may access and use the configuration application 410 to define a list 414(hereafter search list 414) of the searchable SaaS virtual applications 404. Searchable SaaS virtual application 404 in the search list 414 includes corresponding configuration information 416 regarding where and how to search for data in the searchable SaaS virtual application 404.

According to embodiments, a background search agent service 418 (also generally referred to as search agent 418) is provided for performing a data search in the searchable SaaS virtual applications 404 included in the search list 414, based on the configuration information 416 included in the search list 414. For example, when a user 408 performs a data search using a set of search terms (e.g., key words) 420 in the client application 400, the client application 400 provides the set of search terms 420 to the search agent 418, which performs a background search process including: sending a search request 422 to the source SaaS applications 406 corresponding to the searchable SaaS virtual applications 404 included in the search list 414; receiving search responses 424 from the source SaaS applications 406; consolidating the received search responses 424 into a search results list 426, and providing the search results list 426 to the user 408. The background search process is performed without the user 408 having to open any of the searchable SaaS virtual applications 404 in the search list 414. The search request 422 may be sent to the source SaaS applications 406 via the client 102 or may be sent directly to the source SaaS applications 406 by the search agent 418.

The search agent 418 may be provided as part of the client application 400, as a separate program on the client 102, on a server 106, or in any other suitable manner. According to embodiments, the search agent 418 executes in the background (e.g., as a daemon and/or the like) and performs the above-described background search process in response to a data search by the user 408 in the client application 400.

FIG. 5 depicts illustrative configuration information 416 for searchable SaaS virtual applications 404 in the search list 414 according to embodiments. As shown, the configuration information 416 in the search list 414 for a searchable SaaS virtual application 404 may include, for example:

A) The name 430 of the searchable SaaS virtual application 404;
B) A location 432 (e.g., a Universal Resource Locator (URL) for requesting a search in the source SaaS application 406 corresponding to the searchable SaaS virtual application 404;
C) The request format 434 for the search request 422;
D) The response format 436 for the search response 424;
E) The communication protocol 438 for the search request 422 and the search response 424 (e.g., Hypertext Transfer Protocol (HTTP) or Hypertext Transfer Protocol Secure (HTTPS), GET or POST);
F) An authentication attribute 440 for the search request 422 (e.g., authentication required/authentication not required); and
G) An authentication method 442 if authentication is required.

An example (in eXtensible Markup Language (XML)) of configuration information 416 for a searchable SaaS virtual application 404 named "Citrix Support and Services" is provided below:

```
<searchable_saas_application>
    <application_name>Citrix Support and
Services</application_name>
<search_request>
    <search_url>support.citrix.com/search/api/v1/search/gcs/all</search_url>
    <request_method>GET</request_method>
    <request_format>q=[KEY_WORDS]&startIndex=1</request_format>
</search_request>
<communication_protocol>HTTPS</communication_protocol>
<authentication >
    <is_required>NO</is_required>
    <authentication_method>NA<authentication_method>
</authentication>
<search_response>
    <response_format>JSON</response_format>
    <title_field_name>title</title_field_name>
    <desp_field_name>snippet</desp_field_name>
<url_field_name>link</url_field_name>
</search_response>
</searchable_saas_application>
```

In the above example, it can be seen that:
A) The name 430 of the searchable SaaS virtual application 404 is "Citrix Support and Services";
B) The location (e.g., URL) 432 for requesting a search in the source SaaS application 406 corresponding to the searchable SaaS virtual application 404 is "support.citrix.com/search/api/v1/search/gcs/all";
C) The request format 434 for the search request 422 is "q=[KEY_WORDS]&startIndex=1";
D) The response format 436 for the search response 424 is "JSON" (JavaScript Object Notation);
E) The communication protocol 438 for the search request 422 and the search response 424 is "HTTPS";
E) The authentication attribute 440 for the search request 422 is "NO"; and
F) The authentication method 442 is "NA" (not applicable) since authentication is not required.

Figure 6:
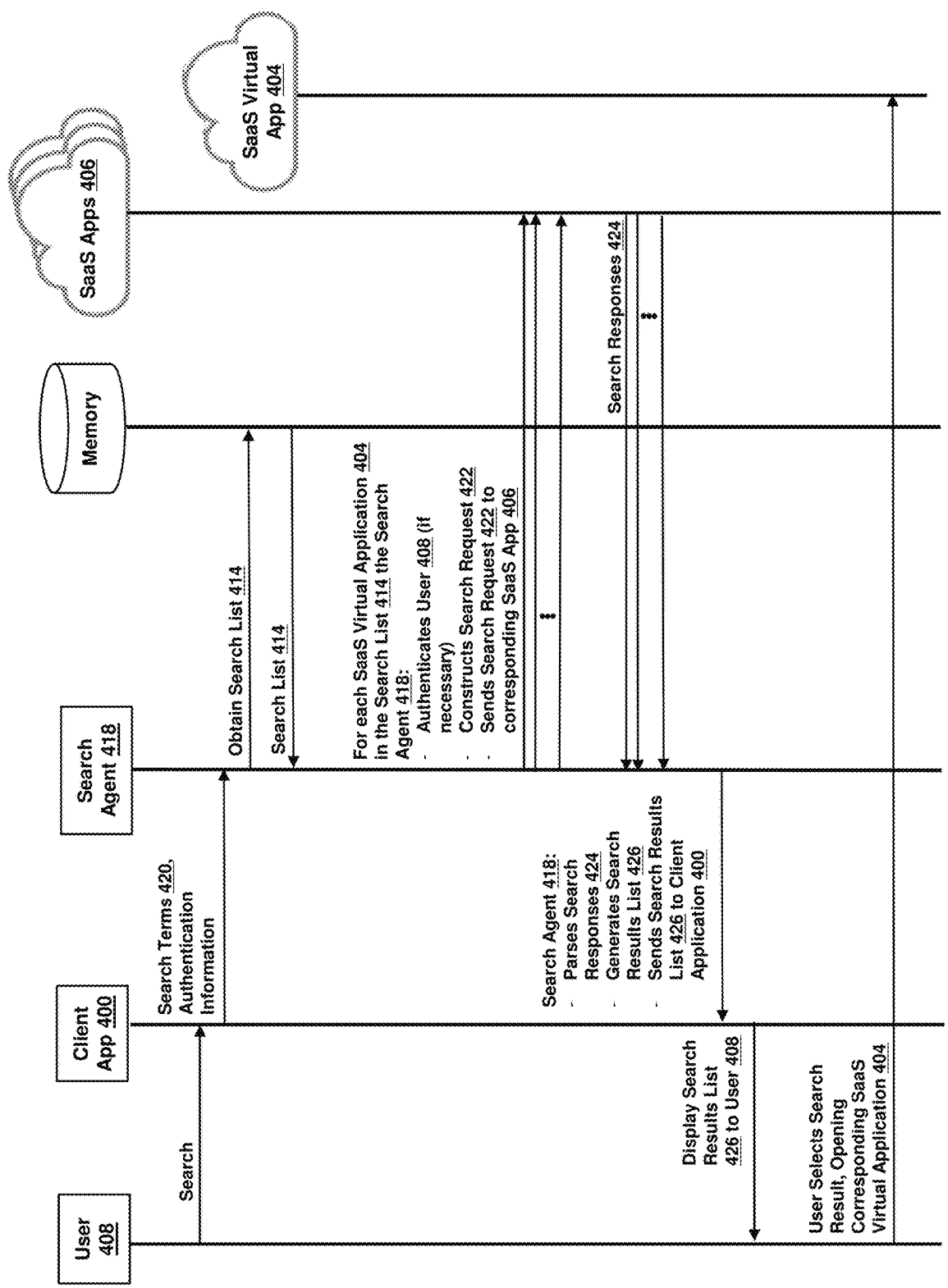
FIG. 6 depicts a data flow diagram of a method for searching SaaS virtual applications according to embodiments.

A data flow diagram of a method for searching SaaS virtual applications 404 in accordance with embodiments is depicted in FIG. 6, which is described with reference to FIGS. 4 and 5. As shown, when a user 408 performs a search in the client application 400, the client application 400 sends the search terms 420 to the search agent 418, together with any necessary authentication information (e.g., username, password) for the user 408. In response, the search agent 418 obtains (e.g., from memory) and examines the search list 414 (and configuration information 216 therein) and, for searchable SaaS virtual application 404 in the search list 414, the search agent 418 authenticates the user 408 for the searchable SaaS virtual application 404 (if necessary), constructs a search request 422 per the format set forth in the configuration information 416 in the search list 414, and sends the search request 422 to the search location 432 for the corresponding source SaaS application 406 using the communication protocol 438 set forth in the configuration information 216 in the search list 414.

According to embodiments, the search agent 418 receives search responses 424 from the source SaaS applications 406 for the sent search requests 422. When the search responses 424 have been received, the search agent 418, parses the received search responses 424, integrates the data in the search responses 424 into a search results list 426, and sends the search results list 426 back to the client application 400. The integration of the search responses 424 may include, for example, filtering/weighting the data in the search responses 424 per search term matching level, user historical preference(s), and/or any other suitable criteria. In other embodiments, the search agent 418 may set a time period for receiving the search responses 424 and only include data in the search results list 426 for search responses 424 received within the time period.

The client application 400 displays the search result list 426 to the user 408 via the interface 402. The user 408 may select an item in the search results list 426. In response, the client application 400 opens the searchable SaaS virtual application 404 associated with the selected item and directs the user 408 to a page/screen in the searchable SaaS virtual application 404 containing the selected search result.

Expanding upon the above example, when the user 408 searches for the search terms 420 "desktop lock" in the client application 400, the client application 400 sends the search terms 420 "desktop lock" to the search agent 418. In response, the search agent 418 constructs different search requests 422 for the searchable SaaS virtual applications 404 included in the search list 414 and sends the search requests 422 to the corresponding source SaaS applications 406. For example, for the source SaaS application 406 named "Citrix Support and Services" at the location 432 "support.citrix.com/search/api/v1/search/gcs/all", the search request 422 may be as follows:

"https://support.citrix.com/search/api/v1/search/gcs/all?q=desktop%20lock&startIndex=1".

An example of a search response 424 received by the search agent 418 for a search request 422 for the search terms 420 "desktop lock" is as follows:

{
    "totalResults": 4530,
    "count": 10,
    "startIndex": 1,
    "items": [
      {
        "title": "Citrix Receiver for Windows <b>Desktop Lock</b>",
        "snippet": "You can use the Citrix Receiver for Windows <b>Desktop Lock</b> when you do not <br>\nneed to interact with the local desktop. You can still use the Desktop Viewer (if ...",
        "link": "https://docs.citrix.com/en-us/receiver/windows/current-release/receiver-windows-desktop-lock.html", -continued "displayLink": "docs.citrix.com",
        "source": "docs",
        "additionalProperties": {
            "productFamily": "receiver windows",
            "modifiedDate": "2019-2-19"
        }
      },
      ...
    ]
}

The search agent 418 may consolidate the search responses 424 into the following search result list 426, which is sent back to the client application 400:

{
    "results": [
      {
        "title": "Citrix Receiver for Windows <b>Desktop Lock</b>",
        "description": "You can use the Cirtix Receiver for Windows <b>Desktop Lock</b> when you do not <br>\nneed to interact with the local desktop. You can still use the Desktop Viewer (if ...",
        "url": https://docs.citrix.com/en-us/receiver/windows/current-release/receiver-windows-desktop-lock.html
      },
      ...
    ]
}

Figure 7:
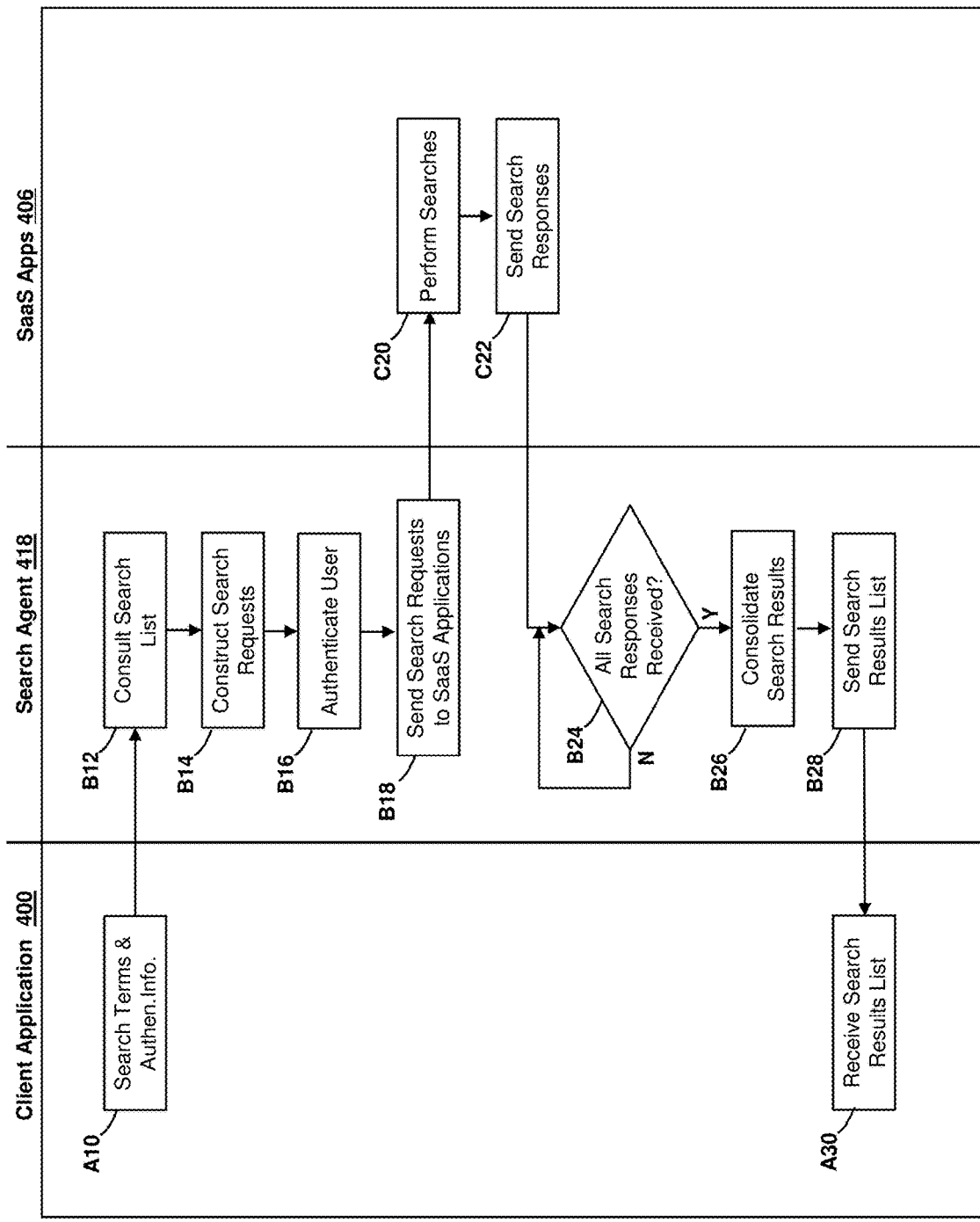
FIG. 7 depicts a swim-lane diagram of a method for searching SaaS virtual applications according to embodiments.

A swim-lane diagram of a method for searching SaaS virtual applications 404 from the perspective of the client application 400, search agent 418, and source SaaS applications 406 is depicted in FIG. 7. Processes carried out by the client application 400 are noted with an alphabetic indicator 'A', processes carried out by the search agent 418 are noted with an alphabetic indicator 'B', and processes carried out by the source SaaS applications 406 are noted with an alphanumeric indicator 'C'.

At process A10, the client application 400 provides search terms 420 entered by the user 408 (e.g., using the search functionality of the client application 400) to the search agent 418 (along with authentication information for the user 408, if necessary). At process B12, the search agent 418 examines the search list 414 and, at process B14, constructs a search request 422 for searchable SaaS virtual applications 404 in the search list 414, per the format set forth in the configuration information 416 in the search list 414. At process B16, the search agent 418 authenticates the user 408 (if necessary) with the searchable SaaS virtual applications 404 in the search list 414 requiring authentication. At B18, the search agent 418 sends search requests 422 to the source SaaS applications 406 corresponding to the searchable SaaS virtual applications 404 listed in the search list 414.

At process C20, source SaaS applications 406 that received a search request 422 from the search agent 418 perform a search based on the search terms 420 and, at process C22, sends a search response 424 back to the search agent 418. At process B24, the search agent 418 receives search responses 424 from the source SaaS applications 406 for sent search requests 422. At process B26, after receipt of the search responses 424, the search agent 418 consolidates the received search responses 424 into a search results list 426, which is provided by the search agent 418 to the client application 400 and user 408 at process B28. At process A30, the user 408 receives the search results list 426. As can be seen from the swim-lane diagram depicted in FIG. 7, the search process is performed in the background without the user 408 having to open any of the searchable SaaS virtual applications 404 in the search list 414.

Figure 8:
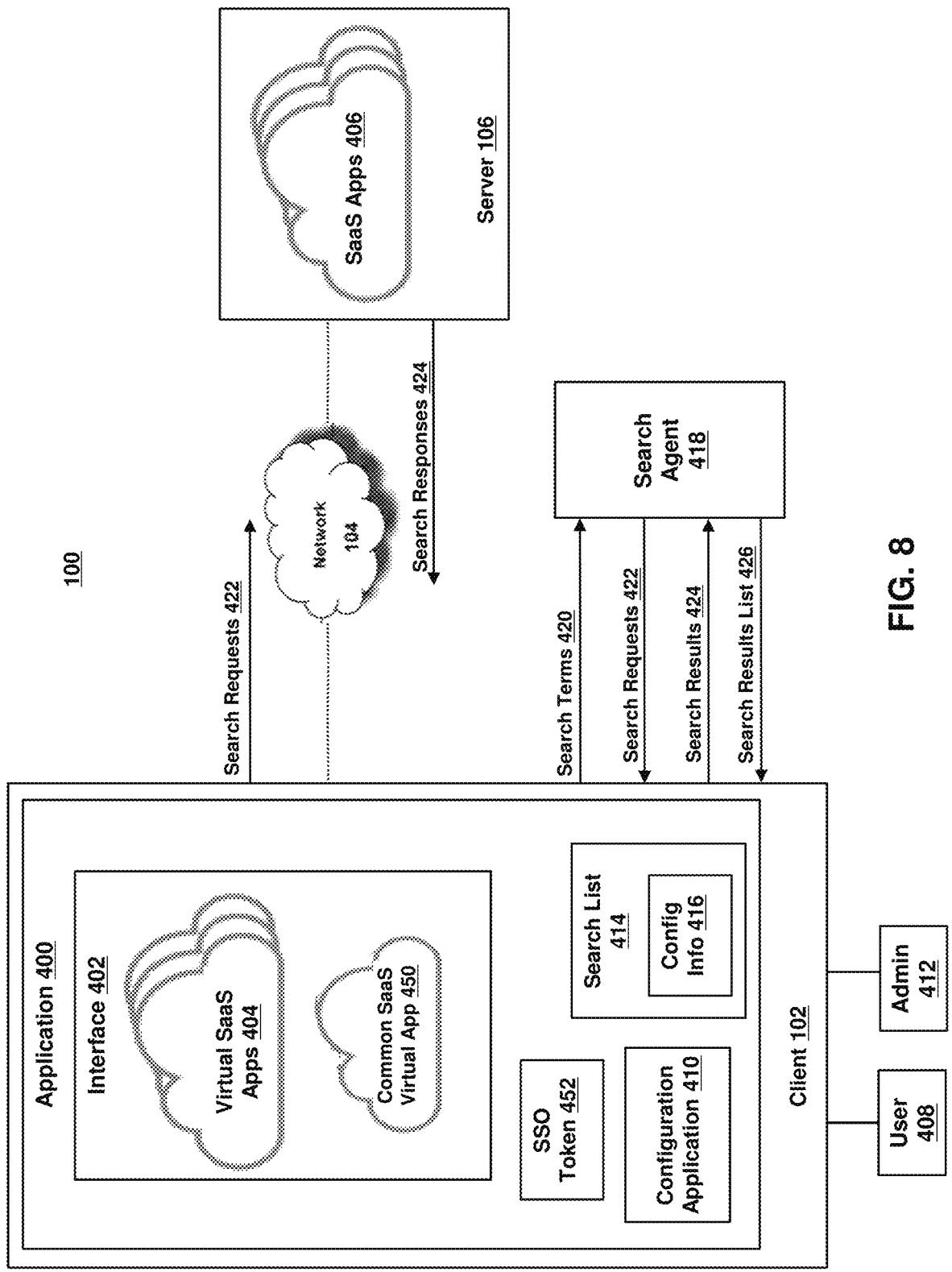
FIG. 8 depicts a system for searching SaaS virtual applications according to other embodiments.

According to other embodiments, as depicted in FIG. 8, the above-described process may be provided with authentication (e.g., single sign-on (SSO)). Instead of interacting directly with source SaaS applications 406, the search agent 418 communicates with a common SaaS virtual application 450, which may be pre-opened or opened in response to the user 408 performing a search in the client application 400 (e.g., opened by the search agent 418 or the client application 400). The common SaaS virtual application 450 may include, for example, any SaaS virtual application capable of: performing SSO user authentication; and communicating search requests 422 from the search agent 418 to the source SaaS applications 406 and communicating search responses 424 from the source SaaS applications 406 back to the search agent 418. The common SaaS virtual application 450 may be separate from the searchable SaaS virtual applications 404 or may include one of the searchable SaaS virtual applications 404.

Figure 9:
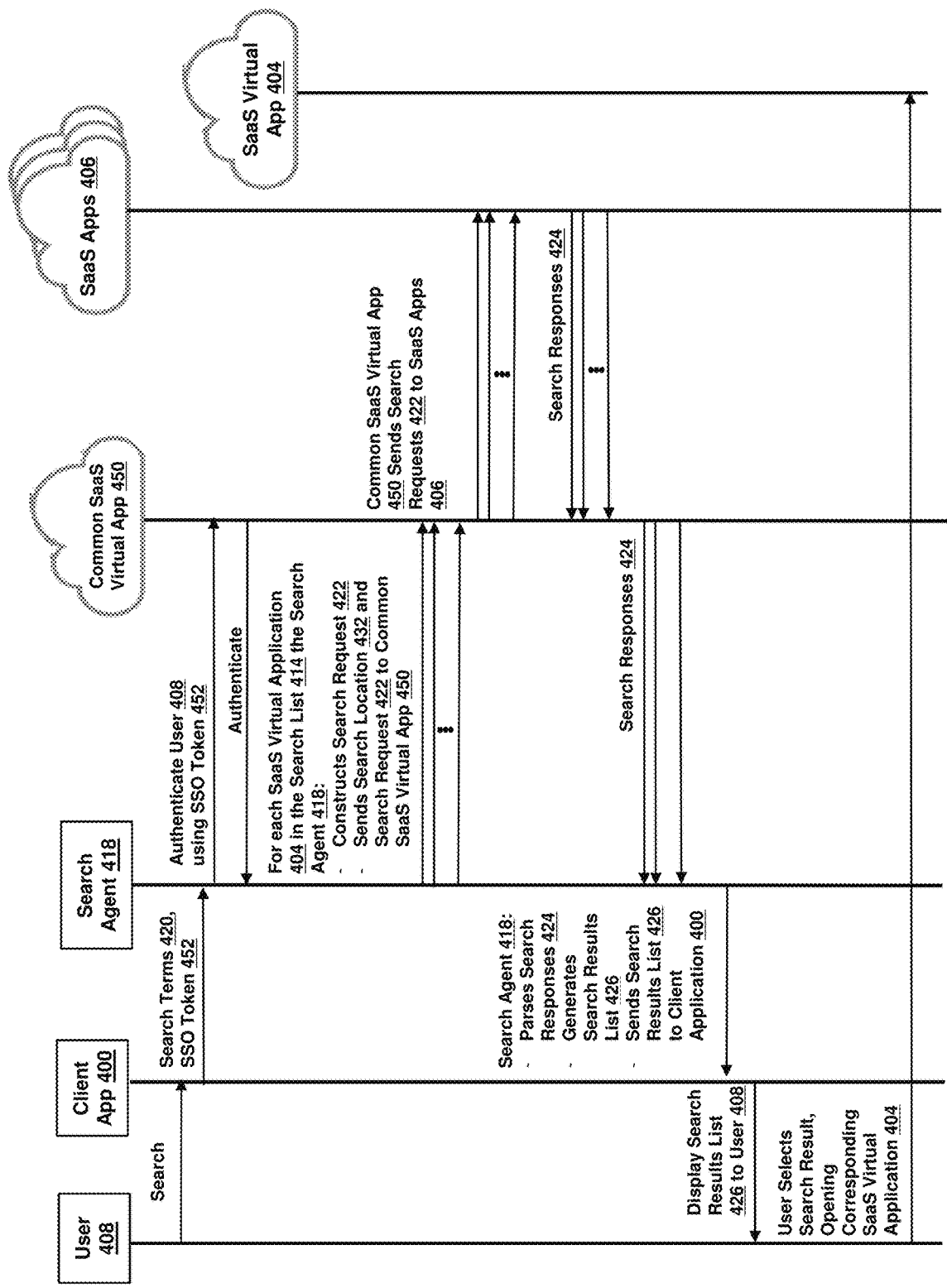
FIG. 9 depicts a data flow diagram of a method for searching SaaS virtual applications according to other embodiments.

A data flow diagram of a method for searching SaaS virtual applications 404 with SSO authentication in accordance with embodiments is depicted in FIG. 9, which is described with reference to FIGS. 5 and 8. As shown, when a user 408 initiates a search in the client application 400, the client application 400 sends the set of search terms 420 to the search agent 418, together with the SSO token 452 of the user 408. The search agent 418 authenticates the user 408 via the common SaaS virtual application 450 using the SSO token 452 of the user 408, which authenticates the user 408 with all of the searchable SaaS virtual applications 404.

After successful authentication of the user 408, the search agent 418 examines the search list 414 (and configuration information 216) and, for searchable SaaS virtual applications 404 in the search list 414, the search agent 418 constructs a search request 422 per the format set forth in the configuration information 416 in the search list 414. The search agent 418 then directs, for searchable SaaS virtual applications 404 in the search list 414, the common SaaS application 450 to send the search request 422 to the search location 432 of the corresponding source SaaS application 406 using the communication protocol 438 set forth in the configuration information 216 in the search list 414.

The common SaaS virtual application 450 receives the search responses 424 from the source SaaS applications 406 and forwards the search responses 424 to the search agent 418. When the search responses 424 have been received, the search agent 418 parses the received search responses 424, integrates the data in the search responses 424 into a search results list 426, and sends the search results list 426 back to the client application 400. The integration of the search responses 424 may include, for example, filtering/weighting the data in the search responses 424 per search term matching level, user historical preference(s), and/or any other suitable criteria. In other embodiments, the search agent 418 may not wait to receive search responses 424 for all sent search requests 422. For example, the search agent 418 may set a time period for receiving the search responses 424 and only include data in the search results list 426 for search responses 424 received within the time period.

The client application 400 displays the search result list 426 to the user 408 via the interface 402. The user 408 may select an item in the search results list 426. In response, the client application 400 opens the searchable SaaS virtual application 404 associated with the selected item and directs the user 408 to a page/screen in the searchable SaaS virtual application 404 containing the selected search result.

Figure 10:
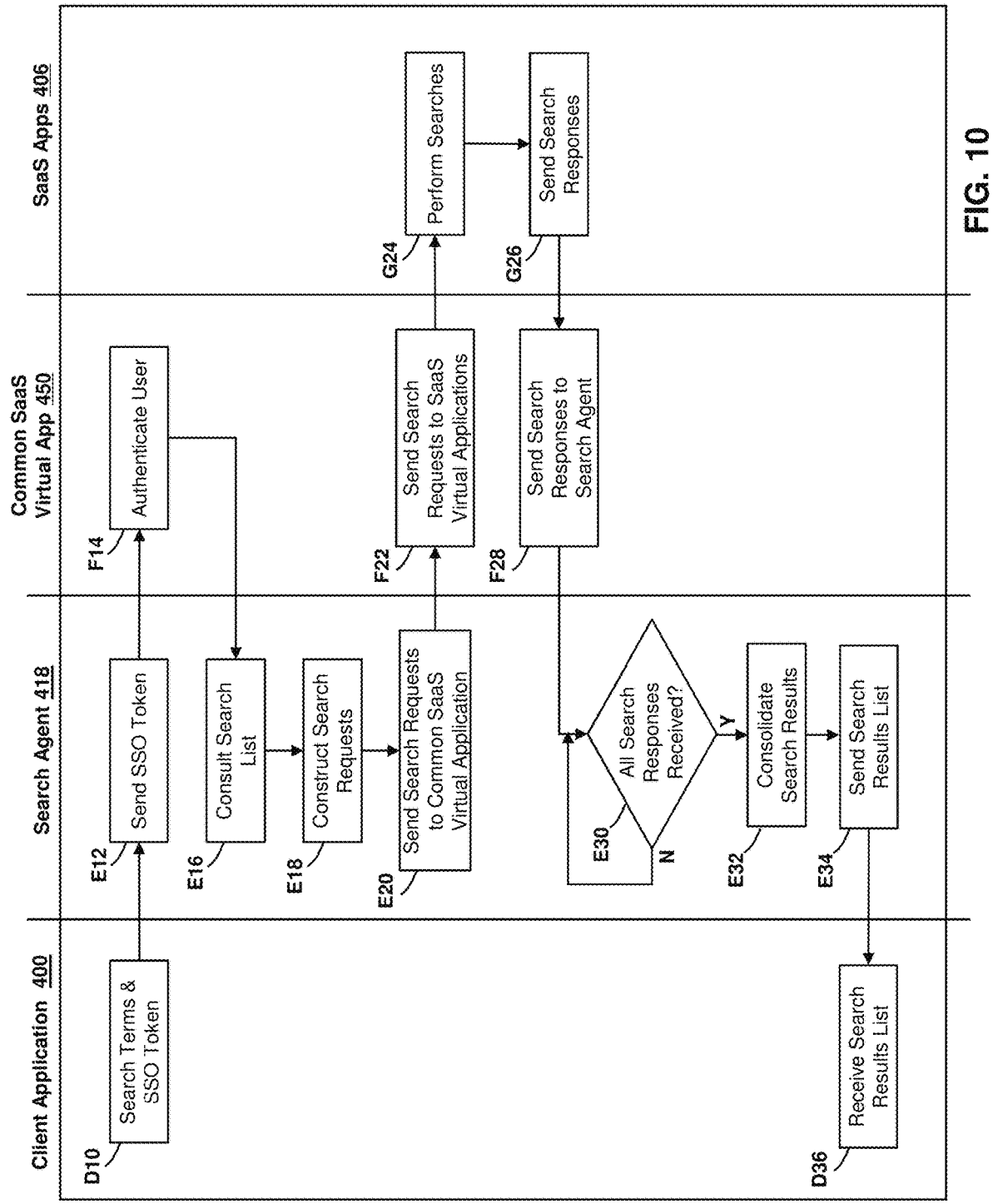
FIG. 10 depicts a swim-lane diagram of a method for searching SaaS virtual applications according to other embodiments.

A swim-lane diagram for searching SaaS virtual applications 404 from the perspective of the client application 400, search agent 418, common SaaS virtual application 450, and source SaaS applications 406 is depicted in FIG. 10. Processes carried out by the client application 400 are noted with an alphabetic indicator 'D', processes carried out by the search agent 418 are noted with an alphabetic indicator 'E', processes carried out by the common SaaS virtual application 450 are noted with an alphabetic indicator 'F', and processes carried out by the source SaaS applications 406 are noted with an alphanumeric indicator 'G'.

At process D10, the client application 400 provides search terms 420 entered by the user 408 using the search functionality of the client application 400 to the search agent 418 along with the SSO token 452 of the user 408. At process E12, the search agent 418 sends the SSO token 452 of the user 408 to the common SaaS virtual application 450. At process F14, the common SaaS virtual application 450 authenticates the user 408 using the SSO token 452.

At process E16, after the user 408 has been authenticated, the search agent 418 examines the search list 414 and, at process E18, constructs a search request 422 for searchable SaaS virtual applications 404 in the search list 414 per the format set forth in the configuration information 416 in the search list 414. At process E20, the search agent 418 sends the search requests 422 to the common SaaS virtual application 450, which forwards the search requests 422 to the corresponding source SaaS applications 406 at process F22.

At process G24, source SaaS applications 406 that received a search request 422 from the common SaaS virtual application 450 perform a search for the search terms 420 and, at process G26, sends a search response 424 back to the common SaaS virtual application 450. At process F28, the common SaaS virtual application 450 forwards the search responses 424 to the search agent 418.

At process E30, the search agent 418 receives search responses 424 from the source SaaS applications 406 (via the common SaaS virtual application 450) for all sent search requests 422. At process E32, after receipt of the search responses 424, the search agent 418 consolidates the received search responses 424 into a search results list 426, which is provided by the search agent 418 to the user 408 at process E34. At process D36, the user 408 receives the search results list 426 from the search agent 418. Again, as can be seen from the swim-lane diagram in FIG. 10, the search process is performed in the background without the user 408 having to open any of the searchable SaaS virtual applications 404 in the search list 414.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for searching applications, comprising:
   receiving, at a unified interface running a computing device, a set of search terms, the computing device having a set of virtual applications configured to run within the unified interface, wherein the set of virtual applications are not opened on the client device when the search terms are received;
   obtaining, at the computing device, a search list that specifies remotely located source applications that are searchable, wherein each source application corresponds to one of the virtual applications;
   constructing a search request for each source application in the search list, each search request including the set of search terms configured for a search function of a respective source application;
   receiving responses from each source application based on the set of search terms;
   providing a list of search results to the computing device; and
   opening a corresponding virtual application within the unified interface via the computing device in response to a selection of a search result from the list of search results.

2. The method according to claim 1, wherein at least one the virtual application comprises a Software as a Service (SaaS) virtual application.

3. The method according to claim 1, wherein the search request further comprises configuration information for the virtual application, the configuration information including:
   a name of the virtual application;
   a location of the source application corresponding to the virtual application;
   a format for the search request and the at least one response; and
   a communication protocol for the search request and the at least one response.

4. The method according to claim 3, wherein the configuration information for the virtual application further includes:
   an authentication attribute for the search request; and
   an authentication method, if authentication is required for the search request.

5. The method according to claim 1, further including:
   providing the search results list to a user within the unified interface.

6. The method according to claim 5, further including bringing the user directly to a source page of content in the virtual application in response to the selection of the item.

7. The method according to claim 1, wherein providing the search request to the source application corresponding to the virtual application further includes:
   providing the search request to a common virtual application; and
   forwarding the search request from the common virtual application to the source application corresponding to the virtual application.

8. The method according to claim 7, wherein receiving the at least one response from the source application corresponding to the virtual application further includes:
   receiving the at least one response at the common application; and
   forwarding the at least one response from the common virtual application to the computer device.

9. The method according to claim 7, further including:
   sending a single sign-on (SSO) token for a user to the common virtual application; and
   authenticating the user with the common virtual application using the SSO token of the user.

10. A computing device, comprising:
    a memory;
    a processor coupled to the memory and configured to perform a method for searching applications, the method including:

receiving, at a unified interface running a computing device, a set of search terms, the computing device having a set of virtual applications configured to run within the unified interface, wherein the set of virtual applications are not opened on the client device when the search terms are received;

obtaining, at the computing device, a search list that specifies remotely located source applications that are searchable, wherein each source application corresponds to one of the virtual applications;

constructing a search request for each source application in the search list, each search request including the set of search terms configured for a search function of a respective source application;

receiving responses from each source application based on the set of search terms;

providing a list of search results to the computing device; and opening a corresponding virtual application within the unified interface via the computing device in response to a selection of a search result from the list of search results.

11. The computing device according to claim 10, wherein at least one virtual application comprises a Software as a Service (SaaS) virtual application.

12. The computing device according to claim 10, wherein the search request further comprises configuration information for the virtual application, the configuration information including:
   a name of the virtual application;
   a location of the source application corresponding to the virtual application;
   a format for the search request and the at least one response; and
   a communication protocol for the search request and the at least one response.

13. The computing device according to claim 12, wherein the configuration information for the virtual application further includes:
   an authentication attribute for the search request; and
   an authentication method, if authentication is required for the search request.

14. The computing device according to claim 10, the method performed by the processor further including:
   providing the search results list to a user within the unified interface.

15. The computing device according to claim 14, the method performed by the processor further including bringing the user directly to a source page of content in the virtual application in response to the selection of the item.

16. The computing device according to claim 10, wherein providing the search request to the source application corresponding to the virtual application further includes:
   providing the search request to a common virtual application; and
   forwarding the search request from the common virtual application to the source application corresponding to the virtual application.

17. The computing device according to claim 16, wherein receiving the at least one response from the source application corresponding to the virtual application further includes:
   receiving the at least one response at the common application; and
   forwarding the at least one response from the common virtual application to the computer device.

18. The computing device according to claim 17, the method performed by the processor further including:
   sending a single sign-on (SSO) token for a user to the common virtual application; and
   authenticating the user with the common virtual application using the SSO token of the user.

19. A computer program product stored on a non-transitory computer readable storage medium, which when executed by a computing system, performs a method for searching applications, the method comprising:
   receiving, at a unified interface running a computing device, a set of search terms, the computing device having a set of virtual applications configured to run within the unified interface, wherein the set of virtual applications are not opened on the client device when the search terms are received;
   obtaining, at the computing device, a search list that specifies remotely located source applications that are searchable, wherein each source application corresponds to one of the virtual applications;
   constructing a search request for each source application in the search list, each search request including the set of search terms configured for a search function of a respective source application;
   receiving responses from each source application based on the set of search terms;
   providing a list of search results to the computing device; and
   opening a corresponding virtual application within the unified interface via the computing device in response to a selection of a search result from the list of search results.

20. The computer program product according to claim 19, wherein the method further comprises:
   providing the search results list to a user within the unified interface.

* * * * *